(12) United States Patent
Perakes et al.

(10) Patent No.: US 8,746,405 B2
(45) Date of Patent: Jun. 10, 2014

(54) VARIABLE LUBRICANT LEVEL IN A DIFFERENTIAL SUMP

(75) Inventors: Andreas E. Perakes, Canton, MI (US);
Jason C. Marcath, Dearborn, MI (US);
Shaun G. Knowles, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 810 days.

(21) Appl. No.: 12/888,451

(22) Filed: Sep. 23, 2010

(65) Prior Publication Data
US 2012/0073403 A1 Mar. 29, 2012

(51) Int. Cl.
*F16H 57/04* (2010.01)
(52) U.S. Cl.
USPC ............................................ 184/6.12; 74/607
(58) Field of Classification Search
CPC ............ F16H 57/0409; F16H 57/0447; F16H 57/045; F16H 57/0457; F16H 57/0471
USPC ............................ 184/6–92; 74/607; 475/160
See application file for complete search history.

(56) References Cited

U.S. PATENT DOCUMENTS

| | | | |
|---|---|---|---|
| 3,529,698 A | 9/1970 | Nelson | |
| 3,625,310 A | 12/1971 | Herrick et al. | |
| 4,018,097 A * | 4/1977 | Ross | 74/467 |
| 5,505,112 A | 4/1996 | Gee | |
| 5,768,954 A | 6/1998 | Grabherr et al. | |
| 5,839,327 A * | 11/1998 | Gage | 74/607 |
| 6,299,561 B1 | 10/2001 | Kramer et al. | |
| 6,523,435 B2 | 2/2003 | Ruehle et al. | |
| 6,997,284 B1 * | 2/2006 | Nahrwold | 184/6.12 |
| 7,140,995 B2 * | 11/2006 | Mierisch et al. | 475/221 |
| 7,178,426 B2 | 2/2007 | Turner et al. | |
| 8,409,044 B2 * | 4/2013 | Hilker et al. | 475/160 |
| 2009/0023531 A1 | 1/2009 | Hilker et al. | |
| 2009/0026014 A1 | 1/2009 | Martin, III et al. | |

* cited by examiner

*Primary Examiner* — William E Dondero
*Assistant Examiner* — Robert T Reese
(74) *Attorney, Agent, or Firm* — James Dottavio; MacMillan, Sobanski & Todd, LLC

(57) ABSTRACT

A system for lubricating a differential mechanism includes a housing containing a ring gear, a pinion meshing with the ring gear, a sump containing fluid, and a reservoir that receives fluid flung from the ring gear as the ring gear rotates through the sump fluid, and an orifice restricting the flow rate of fluid from the reservoir.

13 Claims, 2 Drawing Sheets

VARIABLE LUBRICANT LEVEL IN A DIFFERENTIAL SUMP

BACKGROUND OF THE INVENTION

1. Field of Invention

This present invention relates generally to an automotive differential mechanisms and, more particularly, to lubrication of the gear meshes located in the differential housing.

2. Description of the Prior Art

A differential mechanism transmits rotary power differentially to output shafts from a ring gear driven by an external power source, such as an internal combustion engine or electric motor. A housing, formed of metal and secured to the ring gear, defines a chamber containing bevel pinions driveably connected to the housing by a spindle, a right-side bevel gear and a left-side bevel gear in continuous meshing engagement with the bevel pinions. The side bevel gears are driveably connected to a right-side output shaft and left-side output shaft, each shaft being driveably connected to a wheel of the vehicle.

The ring gear rotates through a fluid sump containing hydraulic lubricant, such as gear lube or automatic transmission fluid (ATF). As the ring gear and other components of the differential apparatus rotate, the ATF is carried from the sump on the surfaces of the ring gear teeth, and is slung onto the outer surface of the housing, from which it migrates into the housing sump. The ATF lubricates the bevel gears and side gears located in the chamber.

Ring gear churning through the sump oil produces in parasitic losses that degrade fuel economy. The level of lubricant in the sump is in part determined by the need to have the gear mesh wet at start-up to prevent damage due to high torque events before the meshing components are lubricated.

Alternatives to this approach include using baffles and pumps in the differential housing. Baffles have limited effectiveness across all operating conditions due to the need to maintain adequate oil flow to the pinion bearings and the axle does not typically uses pressurized oil flow to lubricate bearings. A pump adds significant cost and degrades fuel economy because it must draw a large amount of electric energy from the vehicle in order to pump cold, viscous gear oil.

SUMMARY OF THE INVENTION

A system for lubricating a differential mechanism includes a housing containing a ring gear, a pinion meshing with the ring gear, a sump containing fluid, and a reservoir that receives fluid flung from the ring gear as the ring gear rotates through the sump fluid, and an orifice restricting the flow rate of fluid from the reservoir.

By using a reservoir that retains oil only during operation, parasitic losses are minimized, thereby increasing vehicle fuel economy.

The system provides a lubricated gear mesh at vehicle start-up, enhancing axle durability and axle service life.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
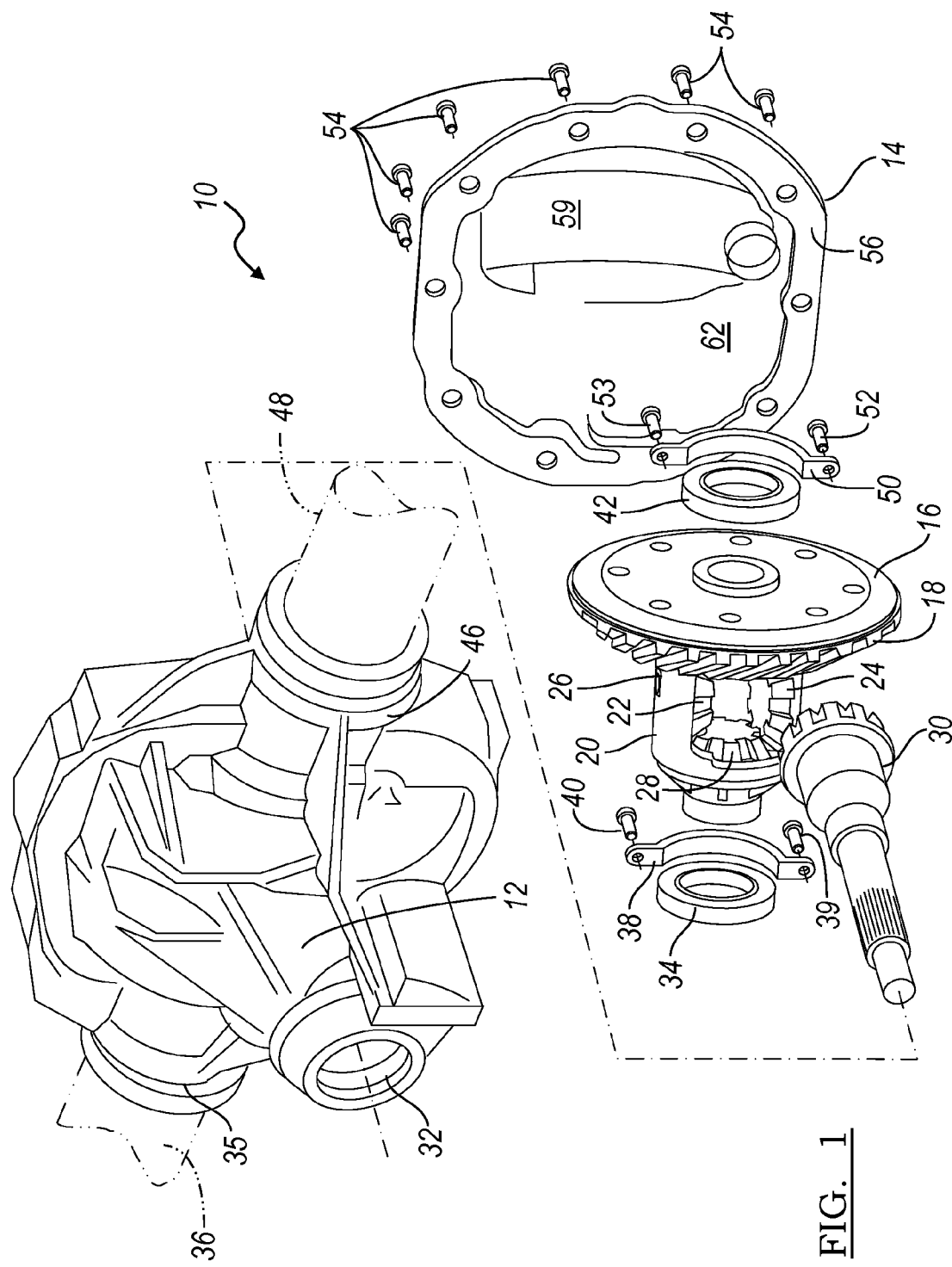
FIG. 1 is a perspective view of a differential assembly with its components shown mutually spaced in their approximate relative positions.

Referring to FIG. 1, a differential mechanism 10 for transmitting power differentially to left-side and right-side axle shafts includes a housing 12, preferably of cast aluminum or cast iron; a ring gear 16 formed with beveled gear teeth 18; a carrier 20 secured to the ring gear; bevel pinions 22, 24 driveably connected to the carrier by a pin 26; a right-side bevel gear 28; and a left-side bevel gear (hidden from view by the ring gear) in continuous meshing engagement with the bevel pinions 22, 24. The teeth 18 of ring gear 16 are in mesh with a bevel pinion 30, which extends through an opening 32 in the housing to the differential mechanism 10. Bevel pinion 30 is connected to a companion flange (not shown), which in turn is connected to a driveshaft (not shown), which transmits output torque from a transmission or a transfer case to the differential mechanism 10.

The side bevel gears 28 are driveably connected, respectively, to a right-side shaft and left-side shaft (not shown), each shaft being driveably connected to a wheel of the vehicle. The right-side shaft is supported by carrier 20 and an additional bearing (not shown) which may be located in housing 12 or in a remote location at the opposite end of axle tube 36, which extends rightward from the differential housing 12 to the right-side wheel. The carrier 20 is supported in housing 12 at a bearing 34 located in a bore on a local boss 35. Bearing 34 is secured to the housing 12 by a bearing cap 38 and bolts 39, 40 threaded into the housing. Similarly, the left-side shaft is supported by carrier 20 and an additional bearing (not shown), which may be located in housing 12 or at the opposite end of axle tube 48 that extends leftward from the differential housing 12 to the left-side wheel. The carrier 20 is supported at the left side of the housing 12 by a bearing 42 located in a bore on a local boss 46. Bearing 42 is secured to the housing 12 by a bearing cap 50 and bolts 52, 53 threaded into the housing.

The cover 14 is secured to the housing 12 by bolts 54, which extend through a mounting flange 56 and engage threaded holes formed in the housing.

The inner surface of the cover 14 is formed with a depression 59, which is set back from the adjacent interior surface 62 and is sized to accommodate the ring gear 16. The inner surfaces of the housing 12 and cover 14 together define an interior space containing the mechanical components of the differential mechanism 10. Preferably, this interior space is vented with a hollow vent tube (not shown) that passes through the wall of the cover 14 or the housing 12. A volume of hydraulic lubricant is also located at the bottom of the interior space bounded by the housing and cover. The ring gear 16 rotates through the lubricant in the sump 62, wetting the surfaces of the gear teeth formed on the ring gear.

Figure 2:
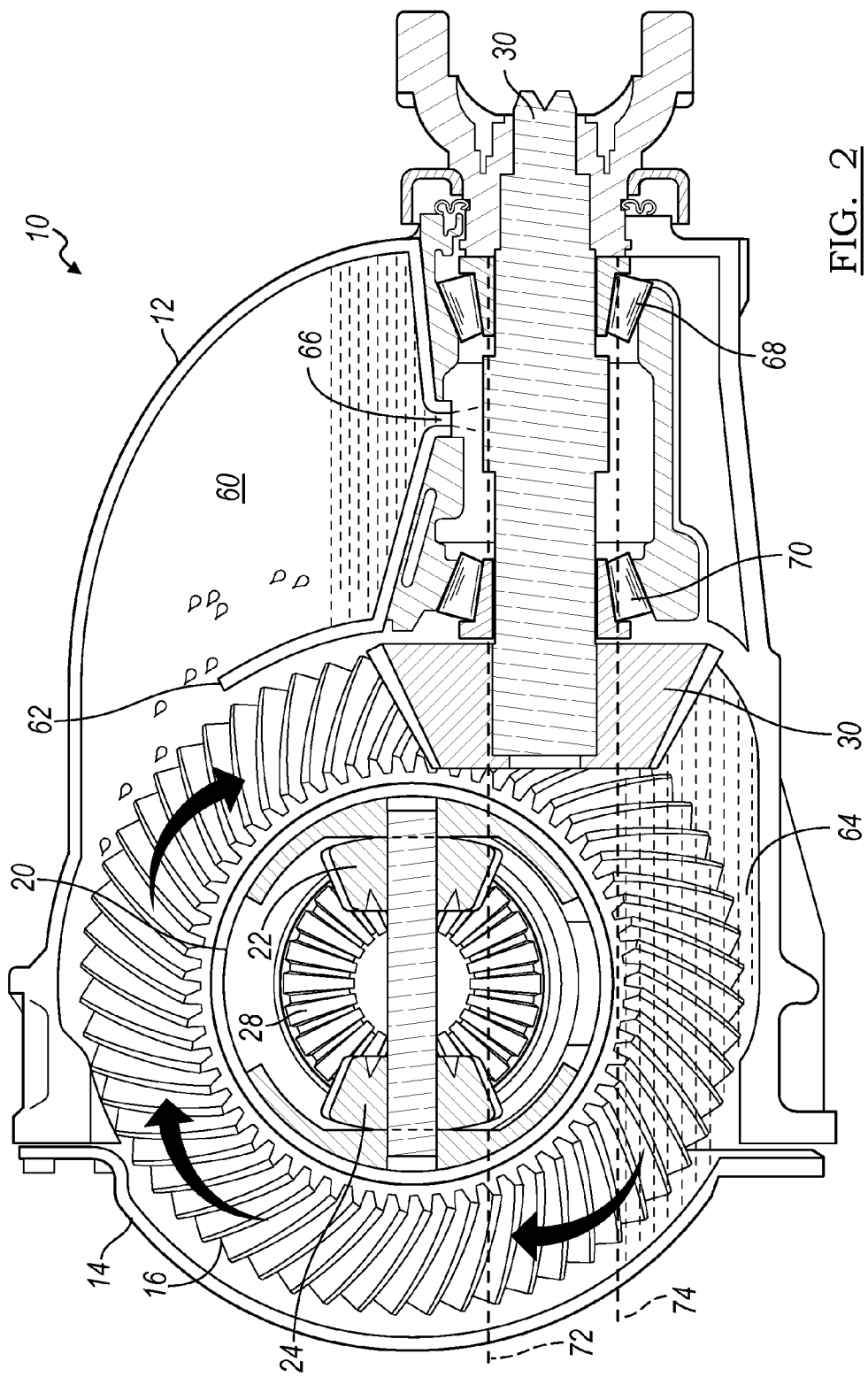
FIG. 2 is cross sectional side view of the differential mechanism of FIG. 1.

Referring to FIG. 2, oil spun off from the ring gear 16 by centrifugal force is diverted into a reservoir 60. The volume of oil diverted to reservoir 60 depends on the height of the inner wall 62 of reservoir 60. Some oil from the ring gear 16 flows into the reservoir 60 and the remainder flows to the sump 64 keeping the gear mesh lubricated. An orifice 66 at the bottom of reservoir 60 controls the flow rate of oil out of reservoir 60 to the pinion bearings 68, 70, which support bevel pinion 30.

After the differential 10 remains stationary for a sufficiently long period, substantially all the oil exits reservoir 60 and accumulates in the sump 64 to the stationary lube level 72, whose elevation ensures that the ring gear 16-bevel pinion 30 mesh is lubricated at startup.

While the differential is operating, oil exiting the reservoir 60 through orifice 66 eventually returns to the sump 64 and accumulates there to the operating lube level 74, whose elevation is lower than the stationary lube level 72.

Orifice 66 can be removed from the housing and replaced with an orifice whose diameter is sized to customize the oil flow rate to the requirements of the bevel pinion bearings 68, 70 and other components. Orifice 66 can be variably controlled by temperature using bimetal or active control.

The reservoir 60 may include exit passages that direct lubricating oil to the bearings 34, 42, which support the carrier 20 and the journalled surfaces on which the bevel pinions 22, 24 are supported, thereby further lowering the operating lube level 74.

The reservoir 60 may be formed integrally with housing 12 or it may be a separate component that is secured mechanically with the housing.

In accordance with the provisions of the patent statutes, the preferred embodiment has been described. However, it should be noted that the alternate embodiments can be practiced otherwise than as specifically illustrated and described.

The invention claimed is:

1. A system for lubricating a differential, comprising:
a ring gear;
a pinion;
a sump;
a reservoir that receives fluid flung from the ring gear as the ring gear rotates through the fluid;
an orifice restricting flow from the reservoir;
a mesh between the ring gear and pinion located at an elevation lower than an upper surface of fluid in the sump when fluid is drained from the reservoir into the sump.

2. The system of claim 1 further comprising:
a bearing fitting in a housing, supporting the pinion for rotation, the bearing located to receive at least a portion of the fluid exiting the orifice before the exiting fluid returns to the sump.

3. The system of claim 1 further comprising:
first and second mutually spaced bearings, each bearing fitted in the housing, supporting the pinion for rotation, and located to receive at least a portion of the fluid exiting the orifice before the exiting fluid returns to the sump.

4. The system of claim 1 wherein:
the sump has a volumetric capacity sufficient to retain fluid whose upper surface is at an elevation that is higher than an elevation of a mesh between the ring gear and pinion.

5. A system for lubricating a differential, comprising:
a housing containing a ring gear;
a pinion meshing with the ring gear;
a fluid sump;
a reservoir at a higher elevation that the sump, partially separated from the ring gear by a wall;
an orifice restricting the flow rate of fluid from the reservoir;
a mesh between the ring gear and pinion located at an elevation lower than an upper surface of fluid in the sump when fluid is drained from the reservoir into the sump.

6. The system of claim 5 wherein an inner surface of the housing and the wall directing into the reservoir fluid flung from the ring gear as the ring gear rotates through the fluid in the sump.

7. The system of claim 5 further comprising:
a bearing supporting the pinion for rotation, the bearing located to receive at least a portion of the fluid exiting the orifice before the exiting fluid returns to the sump.

8. The system of claim 5 further comprising:
first and second mutually spaced bearing, each bearing fitted in the housing, supporting the pinion for rotation, and located to receive at least a portion of the fluid exiting the orifice before the exiting fluid returns to the sump.

9. The system of claim 5 wherein:
the sump has a volumetric capacity sufficient to retain fluid whose upper surface is at an elevation that is higher than an elevation of a mesh between the ring gear and pinion.

10. A system for lubricating a differential, comprising:
a housing containing a ring gear;
a pinion meshing with the ring gear;
a fluid sump;
a reservoir at a higher elevation that the sump, partially separated from the ring gear by a wall;
an orifice restricting the flow rate of fluid from the reservoir;
a bearing supporting the pinion and located to receive fluid exiting the orifice;
a mesh between the ring gear and pinion located at an elevation lower than an upper surface of fluid in the sump when fluid is drained from the reservoir into the sump.

11. The system of claim 10 wherein an inner surface of the housing and the wall directing into the reservoir fluid flung from the ring gear as the ring gear rotates through the fluid in the sump.

12. The system of claim 10 further comprising:
a second bearings supporting the pinion and located to receive at least a portion of the fluid exiting the orifice before the exiting fluid returns to the sump.

13. The system of claim 10 wherein:
the sump has a volumetric capacity sufficient to retain fluid whose upper surface is at an elevation that is higher than an elevation of a mesh between the ring gear and pinion.

* * * * *